United States Patent Office 3,516,681
Patented June 23, 1970

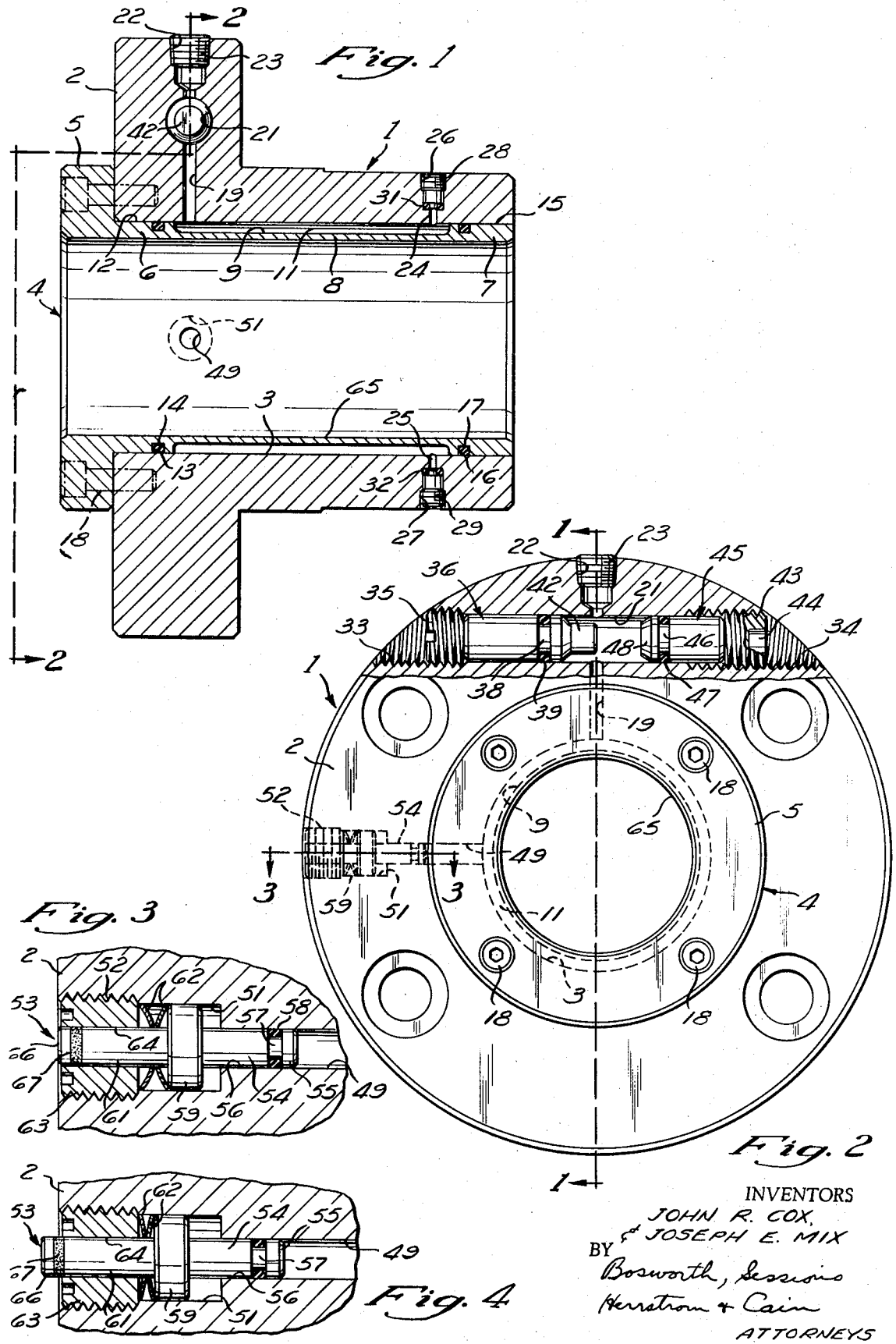

3,516,681
HYDRAULIC CHUCK OR ARBOR
John R. Cox, Lakewood, and Joseph E. Mix, Cleveland, Ohio, assignors to Balas Collet Company, Cleveland, Ohio, a corporation of Ohio
Filed May 16, 1968, Ser. No. 729,818
Int. Cl. B23b 31/30, 25/06, 19/00
U.S. Cl. 279—4         1 Claim

ABSTRACT OF THE DISCLOSURE

A hydraulic chuck or arbor having a thin wall portion adapted to be pressurized into contact with a workpiece or tool by the application of hydraulic pressure on a pressure chamber in the chuck. A pressure indicator is provided that visually indicates the presence of or lack of pressure on the workpiece or tool.

BACKGROUND OF THE INVENTION

This invention relates generally to hydraulic chucks and arbors for holding a workpiece or tool, and more particularly to a chuck or holding device of the type wherein pressure is applied on oil or grease that is confined in an annular chamber to deform a relatively thin wall of the chamber into gripping engagement with a workpiece, tool or the like.

Devices of this type have been used in the holding of various workpieces for machine tools as for example boring mills and lathes. These devices depend upon the hydraulic pressure generated behind a thin wall which forces the thin wall outwardly into contact with a bore in a workpiece or tool or inwardly into contact with a cylindrical outer surface of the same. These hydraulic chucks usually contain a closed system which has been filled with a heavy grease or oil which is not compressible. Mechanical means, such as threaded plungers, are provided to apply pressure on the fluid thereby exerting pressure on the thin wall and forcing it into contact with the workpiece. Various proposals have been made for attempting to prevent leakage of the oil or grease from these pressure chambers. Nevertheless some leakage may at times occur, particularly when the workpiece or tool has been assembled and allowed to stand idle for some time.

If the machine operator is not aware of the leakage with the resultant loosening of the fit between the chuck and workpiece or tool, or the operator fails to check the tightness, damage may result in the workpiece or tool because of slippage between the same and the hydraulic chuck.

SUMMARY OF THE INVENTION

It is therefore an object of the present invention to provide a hydraulic chuck or arbor that includes means to indicate a failure of pressure. A further object of this invention is to provide a hydraulic chuck with means visible to the operator that leakage has occurred in the hydraulic system. Another object of this invention is to provide a hydraulic chuck wherein a visible indicator is provided which indicates to the operator that additional pressure should be applied to the hydraulic system to insure a tight fit between the chuck and workpiece or machine tool.

This invention proposes a hydraulic chuck or arbor having a thin wall portion adapted to be forced into gripping engagement with a workpiece or tool by the application of hydraulic pressure on the thin wall portion. The hydraulic pressure is generated in a pressure chamber which includes a pressure indicator resiliently biased against the pressure in the chamber.

DESCRIPTION OF THE DRAWINGS

The above and other objects and advantages of this invention will become apparent from the following detailed description of one embodiment thereof which is illustrated in the accompanying drawings, wherein:

FIG. 1 is a longitudinal, cross-sectional view of a chuck for gripping a cylindrical tool or workpiece and incorporating this invention, taken along the plane of line 1—1 of FIG. 2;

FIG. 2 is an end elevational view partially in section taken along the plane of line 2—2 of FIG. 1;

FIG. 3 is a fragmentary sectional view taken along the plane of line 3—3 of FIG. 2 illustrating the pressure indicator in low pressure position, and FIG. 4 is a fragmentary sectional view similar to FIG. 3 illustrating the indicator in a high pressure position.

DESCRIPTION OF A PREFERRED EMBODIMENT

Referring now to the drawings, reference numeral 1 denotes the body of the chuck which is provided with a radial flange portion 2, having a cylindrical outer surface by which the chuck may be secured to a machine tool (not shown). The body 1 is provided with a cylindrical bore 3 and a sleeve member 4 is assembled with the body as by a press fit in the bore 3. The sleeve member 4 has an end flange portion 5, a relatively heavy cylindrical wall portion 6, a thickened outer end portion 7, and a relatively thin resilient gripping portion 8 intermediate the heavy wall portion 6 and the outer end portion 7. This gripping portion 8, in conjunction with the wall portion 6 and end portion 7 of the sleeve 4, defines on the external surface of the sleeve 4 a circumferential groove 9 which, when the sleeve member 4 is assembled in the body 1, forms with the bore 3 an annular fluid pressure chamber 11.

The heavy wall portion 6 of sleeve 4 is provided on its exterior surface 12 with an annular groove 13 which contains an O-ring 14. The outer surface 15 of the thickened outer end portion 7 is also provided with an annular groove 16 containing an O-ring 17. These O-rings 14 and 17 insure a fluid-tight seal between the sleeve member 4 and the cylindrical bore 3. Screws 18 extend through flange 5 into the body 1 assist in securing sleeve 4 in position in the bore 3.

The pressure chamber 11 is adapted to be filled with oil, grease or similar fluid through a radial passage 19 in the flange 2. The radial passage 19 is in communication with transverse passage 21, the function of which will be hereinafter explained, and loading hole 22 which is provided with a closure plug 23. The body portion 1 of the chuck is provided with radial passages 24 and 25 which extend into the pressure chamber 11 and connect with bleeder holes 26 and 27, respectively. The bleeder holes 26 and 27 are closed by closure plugs 28 and 29 and sealed by O-rings 31 and 32, respectively.

The transverse passage 21 which extends through the flange 2 is threaded at its ends 33 and 34 (see FIG. 2). A screw member 35 is threaded into the end 33 of transverse passage 21. The screw member 35 is adapted to engage the outer end of a plunger 36 having a sliding fit in transverse passage 21. A groove 38 retains an O-ring packing 39 and a stop 42 extends from the inner end of plunger 36. A pressure adjusting screw 43, having a socketed head 44, is threaded into the other end 34 of the transverse passage 21. The plunger 45 has a sliding fit in the transverse passage 21 and an O-ring 47 is retained in a groove 46 adjacent the inner end 48 of the plunger.

Another radial passage 49 is provided in the flange 2 and extends from the pressure chamber 11 through the flange 2. The radial passage 49 is enlarged at 51 and is provided with a threaded sleeve or guide member 52. A pressure indicator, indicated generally at 53, is positioned within the passage 49.

The pressure indicator 53 comprises a piston 54 having a head end 55 located in the reduced portion 56 of the passageway 49. The piston 54 is provided with an O-ring seal 58 carried in a groove 57 to prevent the passage of oil or grease past the seal 58. Integral with the piston 54 is an enlarged shoulder portion 59 positioned within the enlarged portion 51 of the passageway 49. The shoulder 59 is freely movable within the enlarged portion 51 of the passageway 49. Extending from shoulder 59 in the direction opposite that of the piston 54 is a stem portion 61. A pair of Belleville spring washers 62 are placed on the stem 61. A threaded sleeve member 63 is screwed into the threaded portion 52 of the passageway 49 and the stem 61 of the indicator 53 extends through the cylindrical bore 64 of the sleeve 63 as clearly seen in FIGS. 3 and 4. Although this invention is described with Belleville washers as spring means in the pressure indicator 53, it will be understood that other spring means, such as a coil spring, may be utilized if desired.

In operation, the closure plugs 28 and 29 and their associated O-rings 31 and 32 are removed from bleeder holes 26 and 27. The screw member 35 is threaded into the end 33 of the transverse passage 21 until the stop 42 on plunger 36 is in alignment with the radial passage 19. The pressurizing screw 43 is partially threaded into the end 34 of the transverse passage 21. The plug 23 is removed from the loading hole 22 which is then connected by a suitable fitting and tube or pipe (not shown) to a source of oil, grease or other fluid. This fluid is then forced into the radial passage 19, the pressure chamber 11, the transverse passage 21, and the radial passage 49 until all passages and chambers are completely filled and excess fluid flows out of bleeder holes 26 and 27. When the filling of the system has been completed, closure plugs 28 and 29 are screwed tightly into bleeder holes 26 and 27 and the closure plug 23 is threaded into the loading hole 22 thereby sealing the system.

A workpiece or tool (not shown) is positioned within the cylindrical bore 65 of the sleeve member 4. Pressure is applied to the oil or grease within the pressure chamber 11 by screwing the pressuring member 43 into the transverse passage 21 exerting pressure through plunger 45 against the fluid in passage 21. This pressure will be exerted against the thin gripping portion 8 of the sleeve 4 causing the same to contract against the workpiece or tool thereby tightly gripping same. At the same time, the fluid pressure within the chuck will act on the end 55 of the piston 54 of the indicator 53 to move the piston outwardly against the resilient resistance of the Belleville washers 62. This outward movement of piston 54 (to the left as shown in FIG. 3) will cause the end 66 of the stem portion 61 to project outwardly from the surface of the body flange 2, as seen in FIG. 4. As long as pressure is maintained within the system sufficient to compress the Belleville washers 62 the end portion 66 of the stem will remain outside of the flange 2 thereby providing a visual indication to the operator that sufficient pressure is being maintained in the system to hold the workpiece.

If the pressure in the system decreases, the compressed Belleville washers wihch have been exerting inward pressure on the shoulder 59 of the indicator will move it to the right as seen in the drawings thereby reducing the amount of the end portion 66 of the stem 61 that is visible to the operator and indicating that an increase of the pressure system is required to retain the desired grip on the tool or workpiece.

If desired, the stem 61 may be painted or otherwise marked as at 67 in order that the machine operator will be able more readily and accurately to determine the existence or nonexistence of adequate pressure within the system. If the mark 67 is not visible to the operator, or if the stem 61 is fully retracted into the flange 2, he will know that the pressure within the system has been reduced and that he should make adjustments before operating the machine tool.

This invention has been described with reference to a chuck gripping the outer surface of the workpiece or tool. It will be understood that this invention may be utilized with equal facility with a chuck or arbor designed to grip the bore of a workpiece.

It can be seen from the foregoing that the hydraulic chuck or arbor of this invention eliminates the difficulties of the prior art devices and that various modifications may be made without departing from the spirit of the appended claim.

What is claimed is:

1. A hydraulic chuck comprising a chuck body having a cylindrical bore, a radial flange portion on said body having a cylindrical outer face, a workpiece-gripping sleeve telescopically fitting within said bore and defining with said bore a pressure chamber adapted to be filled with a substantially non-compressible fluid, said sleeve having a wall portion adapted to be radially deformed to grip a workpiece upon application of pressure on the fluid in said chamber, a first radial passage in said flange leading to the chamber for filling said passage and chamber with the fluid, a transverse passage in said flange in open communication with said radial passage, an adjustable stop member in said transverse passage, a plunger movable in said transverse passage to build up pressure in the fluid filling said passages and said chamber, a second radial passage in said flange including a threaded portion and an enlarged portion intermediate the threaded portion and the remainder of the passage, a visual pressure indicator in said second radial passage, said pressure indicator being provided with a piston head portion in said remainder of said passage, a spring member in said enlarged portion of said passage, a shoulder portion intermediate said piston head portion and said spring member and positioned within said enlarged portion, an indicator stem portion extending from said shoulder portion radially outwardly of said flange, and a sleeve member threaded into said threaded portion of said second radial passage and providing guide means for said indicator stem, said spring member being adapted to urge said pressure indicator inwardly of said flange whereby said indicator stem is withdrawn into said flange when the fluid pressure in said chamber is reduced from its work gripping value and projected beyond the outer cylindrical face of said flange when gripping pressure exists in said chamber.

References Cited
UNITED STATES PATENTS

| | | | |
|---|---|---|---|
| 893,483 | 7/1908 | Gray | 137—557 XR |
| 3,087,736 | 4/1963 | Lukas | 279—4 |
| 3,149,752 | 9/1964 | Gagnan | 137—557 XR |
| 3,153,960 | 10/1964 | Allport | 279—4 |
| 3,250,542 | 5/1966 | Winnen | 279—4 |

OTHELL M. SIMPSON, Primary Examiner

D. D. EVENSON, Assistant Examiner